United States Patent [19]

Subbiah

[11] Patent Number: 5,531,523
[45] Date of Patent: Jul. 2, 1996

[54] ROTOR JOURNAL BEARING HAVING ADJUSTABLE BEARING PADS

[75] Inventor: Rajagopal Subbiah, Orlando, Fla.

[73] Assignee: Westinghouse Electric Corporation, Pittsburgh, Pa.

[21] Appl. No.: 456,844

[22] Filed: Jun. 2, 1995

[51] Int. Cl.⁶ .................................................. F16C 17/03
[52] U.S. Cl. ...................................... 384/117; 384/114
[58] Field of Search ................................ 384/117, 114, 384/107, 111, 116, 119

[56] References Cited

U.S. PATENT DOCUMENTS

| | | | |
|---|---|---|---|
| 4,035,038 | 7/1977 | Hinchcliffe et al. | 384/117 |
| 4,627,746 | 12/1986 | Grisel et al. | 384/117 |
| 4,643,592 | 2/1987 | Lewis et al. | 384/117 |
| 5,271,676 | 12/1993 | Keck et al. | 384/117 |

*Primary Examiner*—Lenard A. Footland

[57] ABSTRACT

An adjustable pad bearing for the rotor shaft journal of a steam turbine power system or the like provides a pre-load force on the top half of the journal so as to damp the system and move criticals away from the operating range. An adjustable pad bearing in accordance with the invention provides for maintenance of system vibrations at or below desirable levels. The pre-load force is applied to the top half of the journal as a result of oil or a like viscous fluid collected in a pressure dam in the pad. The position of the pad bearing in relation to the top half of the journal is adjustable to change the magnitude and location of the pre-load force, as well as the pressure dam angular orientation of that force.

9 Claims, 2 Drawing Sheets

ROTOR JOURNAL BEARING HAVING ADJUSTABLE BEARING PADS

FIELD OF THE INVENTION

The present invention relates to rotors for power generation systems, such as steam turbine power systems. More particularly, the present invention relates to an adjustable pad type bearing for the journal of the rotor system wherein the bearing top pad is adjusted to pre-load the journal at a desired pressure-dam angle.

BACKGROUND OF THE INVENTION

The rotor shaft in a steam turbine power system or the like is commonly journaled in bearing systems wherein oil or a like viscous film is disposed between the bearing structure and the outer surface of the rotor shaft to reduce frictional wear in the journal area. Early journal bearing systems comprised a sleeve type bearing wherein the journal was contained in a sleeve structure with an oil film disposed between the journal and the bearing sleeve.

However, several problems became known in the art of these oil bearing systems. As known in the art, the vibrations of the rotor shaft are dependent upon the characteristics of the viscous film layer within which the shaft rotates. Upon rotation of the shaft within the viscous layer, the viscous forces applied to the shaft from the film can be analyzed based upon well known spring and damper properties. As is also known, the viscous layer dampens excessive vibrations of the rotating body.

Operation of the rotor system with sleeve type bearings was known to create an undesirable cross coupling of horizontal and vertical forces on the journal. When the rotational speed of the rotor is operated at a certain "critical speed" associated with natural frequency of the system, this cross coupling of forces on the shaft was known to create undesirably excessive vibration levels, resulting in the so called "oil whirl" problem. The oil whirl problem could not be obviated in the known sleeve type bearing systems because of the cross coupled forces they develop. Consequently, in these systems the rotor may not be operated at desirable rotational speeds.

In response to the oil whirl problems associated with sleeve type bearing systems, two pad tilting pad bearing systems were developed wherein two pads are positioned at the bottom half of the bearing in a tilted relation for supporting the journal. The top half of the bearing remains of the sleeve type for containing the journal. In this regard, the tilting pad bearing system obviates the oil whirl problem due to the elimination of the above-mentioned cross coupled forces in a known manner. The known effect of the tilting pads is to direct the rotor shaft into a more desirable central location within the bearing structure.

However, although the two pad bearing provides stability in the rotor system by eliminating bearing cross-coupled properties, these bearing systems do not have the capability to move away criticals if they occur at running speed.

A known bearing system which provides some stability for the rotor system is commonly referred to as a pressure dam type bearing. This type of bearing system is similar to the sleeve type bearing structure, however, a step or "dam" is formed in a portion of the inner surface of the top half of the bearing, adjacent to the outer surface of the rotor shaft. Upon rotation of the rotor shaft, oil collects under pressure in the dam such that a downward force is directed on the rotor shaft to pre-load the journal, having the effect of damping the vibrations of the journal and maintaining the rotor shaft in a centralized position. This pre-loading of the journal may, under some circumstances, alter the natural frequency of the system so as to raise the rotational critical speed above the desired operational rotation speeds for the rotor shaft such that the turbine system can be operated without undesirably excessive vibrations in the journal area.

However, with these known pressure dam bearing systems, since the dimensions and location of the pressure dam is fixed, the angle at which the pressure dam force is exerted downwardly upon the rotor shaft is also fixed. Accordingly, control of the oil damping forces under the influence of the pre-loading force is limited to specific operating conditions.

It is therefore desirable to provide a journal bearing system which will effectively move rotor system criticals away from the operating range and maintain acceptable levels of vibration over a wide range of operating conditions.

SUMMARY OF THE INVENTION

Accordingly, it is a general object of the current invention to provide an apparatus for adjusting a force exerted downwardly upon the top surface of the rotor shaft in the journal area so as to pre-load the journal and eliminate excessive vibration of the rotor shaft.

Briefly, this object, as well as other objects of the current invention, is accomplished in a journal bearing comprising: (i) a bearing shell encasing a portion of the rotor shaft, (ii) a bearing pad mechanically coupled to the bearing shell and positioned proximate the top half of the journal, the bearing pad having a dam for collecting a fluid film disposed in the bearing shell and encasing the journal such that upon rotation of the rotor shaft a pre-loading force is exerted upon the journal, (iii) an adjustment member mechanically coupled to the bearing pad, the adjustment member being actuatable to adjust the position of the pad in relation to the journal to adjust the point where the pre-loading force is exerted upon the journal.

According to one embodiment of the invention, the adjustment member is gear shaped and is mechanically coupled to gear teeth in the bearing pad for moving the position of the bearing pad in relation to the top surface of the rotor shaft in the journal area.

DETAILED DESCRIPTION OF THE PREFERRED EMBODIMENTS

Figure 1:
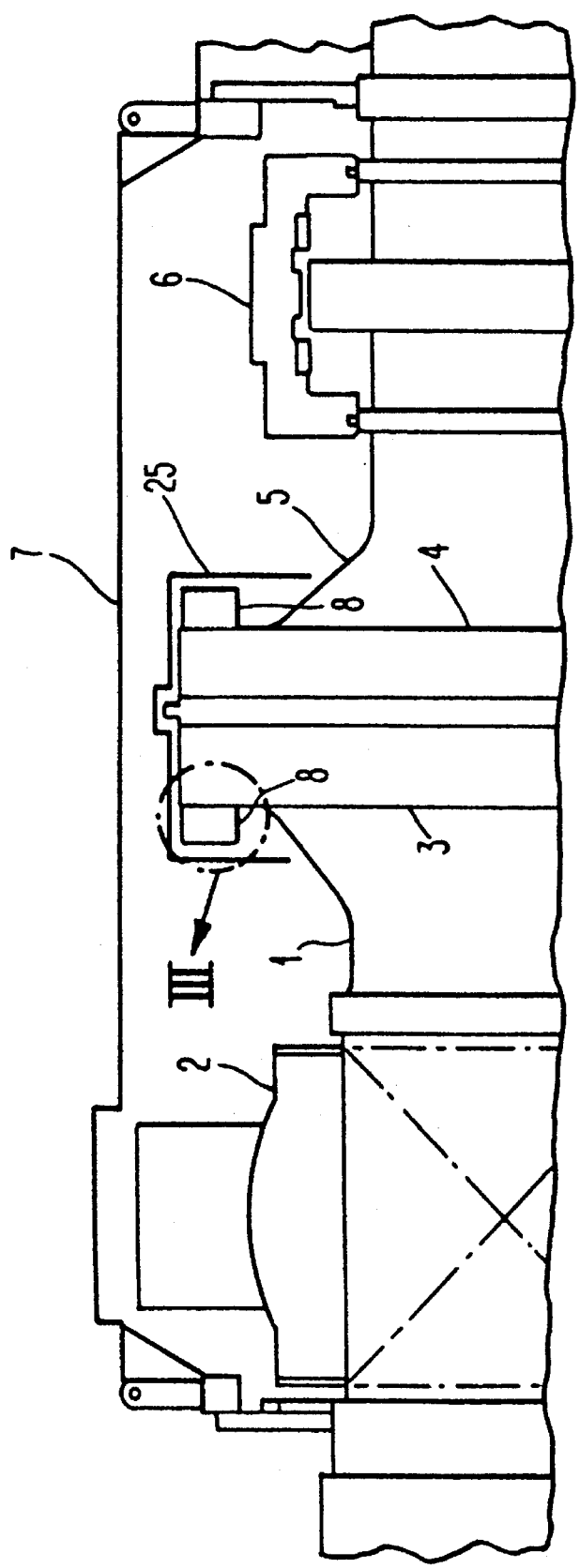
FIG. 1. is an elevation view of a portion of a steam turbine power generation system in the vicinity of the rotor.

Referring to the drawings, there is shown in FIG. 1 a portion of a rotor 1 of a turbomachine, such as a steam turbine or the like. A flange 3 is formed at the distal end of the rotor 1 and mates with a corresponding flange 4 of a second rotor 5. The second rotor may be part of an electric generator driven by the rotor 1 or, if the turbomachine is a steam turbine, may be the rotor of another steam turbine or a jack shaft that is attached to the rotor of another steam turbine. The mated flanges 3 and 4 form a coupling through which the power of the first rotor 1 is transmitted to the second rotor 5. A journal bearing 2 supports rotor 1 in the manner described below.

Figure 2:
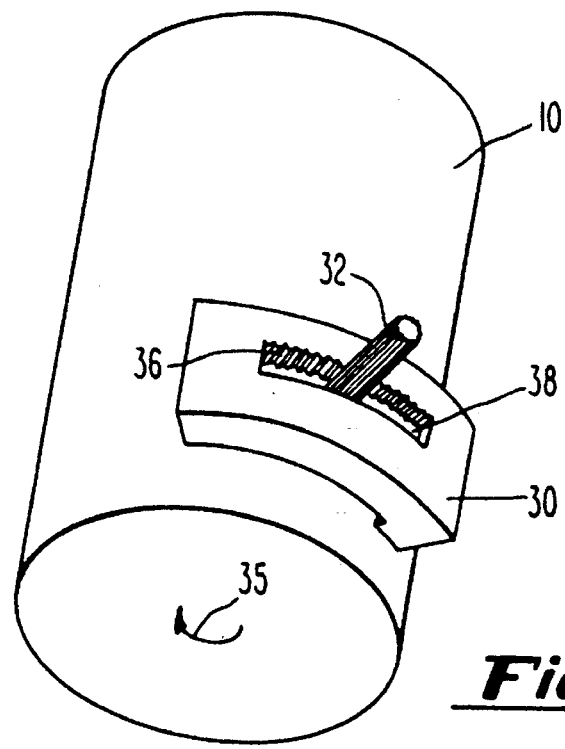
FIG. 2. is a perspective view of an adjustable pad bearing on the rotor journal in accordance with the present invention.

Referring to FIGS. 1 and 2, the end of the rotor shaft, commonly referred to as the journal 10, is journaled in bearing 12. Bearing 12 includes a cover 14 which comprises two halves joined at a mounting flange 16 in a known manner. Within the bearing cover, a pair of tilted bearing pads 18, 20 are mechanically coupled to a bearing shell, or casing 22. As is known in the art, a viscous fluid, such as oil or the like, is contained within casing 22 such that a thin viscous film (not shown) is formed on the outer surface of the journal 10 between the outer surface and the tilted bearing pads 18, 20. Upon rotation of the rotor shaft, the viscous forces of the oil film on the journal are known to cause a cross coupling of forces acting on the journal in the horizontal and vertical directions. As is also known, the effect of the tilted bearing pads 18, 20 is to greatly reduce, or eliminate, this cross coupling of the forces such that the journal 10 rotates in a centralized position within the casing 22.

As discussed, the viscous oil film provides a limited degree of damping of the vibrations of the journal, and thus the bearing structure, in a known manner. However, the effect of these damping forces are insufficient to reduce the vibrations of the system to an acceptable level when the rotor is operated at a known critical speed associated with the natural frequency of the system.

In order to move criticals away from the operating range, thereby reducing excessive vibrations of the journal and bearing structure, the journal is pre-loaded in accordance with the present invention by the application of a downward force on the top half of the journal 10 in the manner herein described.

Figure 3:
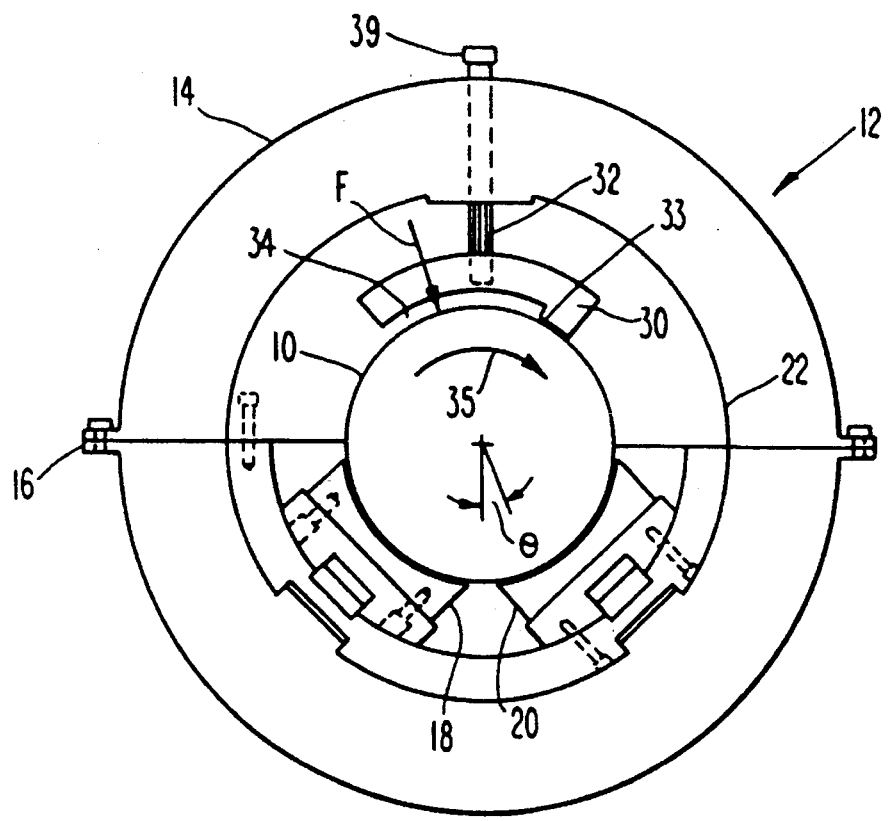
FIG. 3. is a perspective view inside the end portion of the rotor journal in accordance with the present invention.

Adjustable bearing pad 30 is positioned in close proximity to the outer surface of the top half of the journal 10. The gap between the inner surface of pad 30 and the outer surface of the journal 10 shown in FIG. 3 is exaggerated for illustrative purpose. Pad 30 is held in position by adjustment member 32 which is mechanically coupled to the adjustable bearing pad 30 and is supported within the bearing casing 22 and shell 14.

A stepped surface 33 is formed on the inner surface of the adjustable bearing pad 30 such that a dam 34 is formed between the inner surface of the pad 30 and the outer surface of the journal 10. When the rotor shaft rotates in a counter-clockwise direction, as shown by arrow 35, oil collects in the dam 34. The effect of oil collected in the dam 34 is the application of a downward pre-load force F on the top half of the journal which is directed at a pre-load force angle θ with respect to the vertical direction. As discussed, this pre-load force F provides the necessary damping and moves the frequency of the system such that system vibrations are reduced to acceptable levels over a wide range of rotational speeds of the rotor.

Application of the pre-load force F can be moved to different positions on the top half of the journal by adjustment of the adjustment member 32. As shown in FIG. 2, in a preferred embodiment adjustment member 32 is gear shaped and coupled to gear teeth 36 which form a groove 38 in the outer surface of the pad 30. When the adjustment member 32 is turned gear teeth 36 are actuated such that the position of the bearing pad 30 is moved to a different location with respect to the top half of the journal. Consequently, movement of the dam 34 created by movement of the stepped surface 33 of pad 30 causes movement of the pre-load force F to a new position in relation to the journal.

Movement of the pad to a new location could also result in a change in the magnitude of the pre-load force F, as well as the pre-load force angle θ. Thus, the bearing pad 30 can be moved to a position on the journal to provide a desired pre-load force at a desired location so as to provide the necessary damping forces in the system. Adjustment member 32 extends outside of the bearing shell 14 such that the system operator can adjust the position of the adjustable bearing pad by rotating the gear head 39.

Although the current invention has been illustrated with reference to the rotor in a steam turbine, the invention may also be applied to other rotors utilized in turbomachines. Consequently, the current invention may be embodied in other specific forms without departing from the spirit or essential attributes thereof and, accordingly, reference should be made to the appended claims, rather than to the foregoing specification, as indicating the scope of the invention.

I claim:

1. A journal bearing for supporting a rotor shaft, said rotor shaft having a top and bottom half and a top half outer surface and a bottom half outer surface, said journal bearing comprising:

a bearing shell encasing a portion of said rotor shaft;

a bearing pad mechanically coupled to said bearing shell;

a fluid film disposed between said pad and said top half outer surface;

an adjustment member mechanically coupled to said bearing pad; and said bearing pad having a pad surface positioned proximate said top half outer surface, said pad surface having a dam for collecting said fluid film therein upon rotation of said rotor shaft to exert a pre-load force upon said top half outer surface at a pre-load force angle, said adjustment member being actuatable to adjust the position of said pad surface in relation to said top half outer surface thereby adjusting said pre-load force angle.

2. The journal bearing according to claim 1, said bearing pad having gear teeth forming a groove therein, said adjustment member being gear shaped and coupled to said gear teeth.

3. The journal bearing according to claim 1, wherein said adjustment member extends externally of said bearing shell.

4. The journal bearing according to claim 1, further comprising second and third bearing pads mechanically coupled to said bearing shell, said second and third bearing pads disposed in an opposing relation proximate said bottom half outer surface.

5. A journal bearing for supporting a rotor shaft, said rotor shaft having a top and bottom half and a top half outer surface and a bottom half outer surface, said journal bearing comprising:

a rotor shaft support;

a fluid film encasing said top half outer surface and said bottom half outer surface;

a bearing force member proximate said top half outer surface, said bearing force member being positioned to create a force upon a first location on said top half outer surface and being adjustable to reposition said force at a second location on said top half outer surface.

6. The journal bearing according to claim 5, further comprising a gear shaft member for adjusting the position of said bearing force member.

7. In a steam turbine having a rotor and a rotor shaft journaled in a journal bearing, said journal bearing containing a fluid encasing said rotor shaft, an apparatus for exerting a pre-load force downwardly upon said rotor shaft, comprising a pad positioned proximate said rotor shaft and having a dam for collecting said fluid therein upon rotation of said rotor shaft to exert said pre-load force downwardly upon said rotor shaft, and an actuating member mechanically coupled to said pad for adjusting the position of said pad.

8. The steam turbine according to claim 7, said pad having gear teeth forming a groove therein, said actuating member being gear shaped and coupled to said gear teeth.

9. The steam turbine according to claim 7, wherein said actuating member extends externally of said bearing shell.

* * * * *